(12) United States Patent
Iqbal et al.

(10) Patent No.: US 11,652,728 B2
(45) Date of Patent: May 16, 2023

(54) TRAFFIC LOSS AVOIDANCE IN A BORDER GATEWAY PROTOCOL (BGP) NETWORK VIA FLEXIBLE SESSION TRACKING

(71) Applicant: Arista Networks, Inc., Santa Clara, CA (US)

(72) Inventors: Faisal Iqbal, Burnaby (CA); Rajesh Semwal, Sunnyvale, CA (US); Victor Wen, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 49 days.

(21) Appl. No.: 17/484,750

(22) Filed: Sep. 24, 2021

(65) Prior Publication Data
US 2023/0095429 A1    Mar. 30, 2023

(51) Int. Cl.
| | | |
|---|---|---|
| *G06F 15/173* | (2006.01) | |
| *H04L 45/02* | (2022.01) | |
| *H04L 45/42* | (2022.01) | |
| *H04L 43/16* | (2022.01) | |
| *H04L 43/0882* | (2022.01) | |
| *H04L 43/062* | (2022.01) | |

(52) U.S. Cl.
CPC ............ *H04L 45/02* (2013.01); *H04L 43/062* (2013.01); *H04L 43/0882* (2013.01); *H04L 43/16* (2013.01); *H04L 45/42* (2013.01)

(58) Field of Classification Search
USPC ......................................................... 709/238
See application file for complete search history.

(56) References Cited

U.S. PATENT DOCUMENTS

| | | | | |
|---|---|---|---|---|
| 7,551,627 B2* | 6/2009 | Scholl | .................... | H04L 45/56 709/244 |
| 7,813,265 B2* | 10/2010 | Patel | ...................... | H04L 45/22 370/221 |
| 8,155,129 B2* | 4/2012 | Appanna | ................ | H04L 45/54 370/255 |
| 8,169,921 B2* | 5/2012 | Yang | .................... | H04L 41/0681 370/242 |
| 8,806,032 B2* | 8/2014 | Van der Merwe | ...... | H04L 45/02 709/227 |
| 9,178,797 B2* | 11/2015 | Scudder | ................ | H04L 45/023 |
| 9,830,289 B2* | 11/2017 | Pulyala | ................. | G06F 13/287 |
| 10,764,120 B1* | 9/2020 | Means | .................. | H04L 45/586 |
| 2010/0080115 A1* | 4/2010 | Yang | .................... | H04L 41/0681 370/216 |

\* cited by examiner

Primary Examiner — Anthony Mejia
(74) Attorney, Agent, or Firm — Sprinkle IP Law Group

(57) ABSTRACT

In general, in one aspect, embodiments relate to a method for managing network devices in a network. The method includes making, by a network device, a determination that there are no established sessions between the network device and any of a plurality of network devices, wherein the network comprises the network device and the plurality of network devices, and in response to the determination, disabling, by the network device, an interface associated with a link between the network device and a second network device, wherein the second network device is external to the network.

20 Claims, 4 Drawing Sheets

TRAFFIC LOSS AVOIDANCE IN A BORDER GATEWAY PROTOCOL (BGP) NETWORK VIA FLEXIBLE SESSION TRACKING

BACKGROUND

In order to transmit packets over a network, network devices need to obtain routing information. If a network device is unable to obtain routing information, then the network device will not be able to transmit the packets it receives towards their intended destination. As a result, the packets received by the network device are dropped, which negatively impacts the performance of the network.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Figure 1:
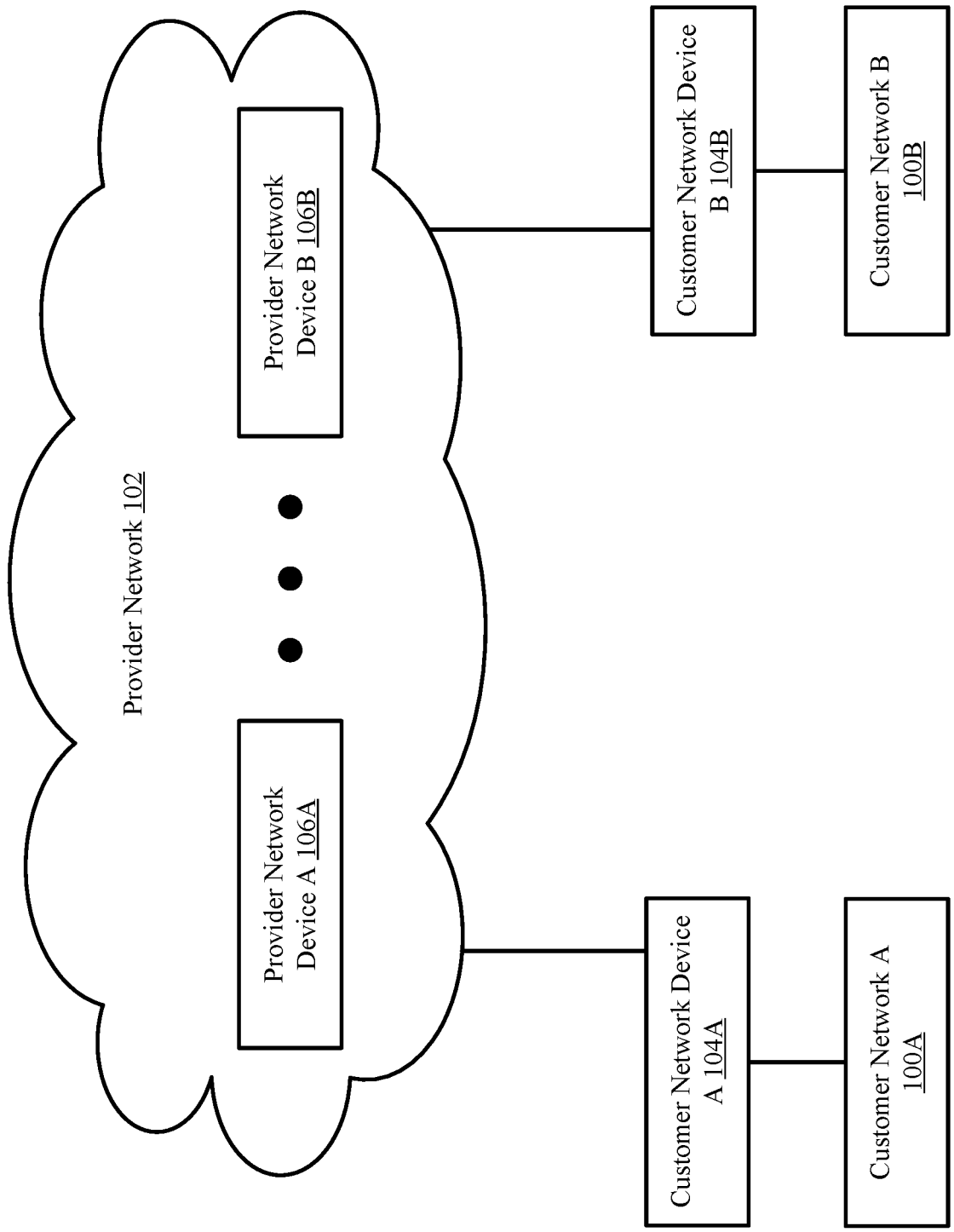
FIG. 1 shows a diagram of a system in accordance with one or more embodiments.

Customer devices (e.g., servers) communicate with each other over networks provided by service providers. These networks (also referred to as provider networks) includes one or more provider network devices (e.g., routers, switches, multi-layer switches). The provider network devices enable packets to be communicated over the provider network. In order for a customer device (referred to as a source customer device) to transmit packets to another customer device (referred to as a target customer device) via the provider network, the source customer device sends its packets to a customer network device (also referred to as a customer edge network device) that is directly connected to one of the provider network devices (also referred to as a provider edge network device). Once the packets are received by the provider edge network device, they are transmitted via one or more provider network devices to a second provider edge network device. The packets are then transmitted from the second provider edge device to a second customer edge network device. The second customer edge network device then transmits the packets towards the target customer device.

In order for the packets to be transmitted within the provider network, the provider network devices use Border Gateway Protocol (BGP). Specifically, the provider network devices establish BGP sessions with each other in order to exchange routing information. The provider network devices then use this routing information to transmit the packets through the provider network. If a given provider network device is unable to establish a BGP session with at least one other provider network device, then such a provider network device will not have sufficient routing information to transmit the packets through the provider network. In such scenarios, when the provider network device does not have sufficient routing information but continues to receive packets from a customer edge network device, such received packets will be dropped as the provider network device is unable to transmit these packets to any other provider network device.

To minimize scenarios in which packets are dropped by a provider network device, embodiments of the disclosure implement session tracking in provider network devices. The session tracking enables the provider network devices to determine whether they have at least one established BGP session with at least one neighbor. Within the BGP protocol, a "neighbor" of a network device in BGP is a second network device with which the network device is configured to establish a BGP session using Transmission Control Protocol (TCP). If a given provider network device does not have at least one neighbor with which it has an established BGP session, then the provider network disables one or more interfaces associated with one or more links (also referred to as downlinks interfaces) with one or more customer edge network devices.

By disabling the interfaces, the corresponding customer edge network devices are immediately (or nearly immediately) notified that packets can no longer be sent on the links associated with the disabled interfaces. In response to this notification/determination, the customer edge network devices stop sending, or attempting to send, packets on the links associated with the disabled interfaces. This results in no (or minimal) packets being dropped as the customer edge network devices are able to immediately (or nearly immediately) stop sending packets on links with the disabled interfaces.

In one or embodiments, this approach may be more efficient than attempting to remove routes associated with the link(s). Said another way, the customer edge network device may stop sending packets over links to a provider edge network device that does not have any established BGP sessions by withdrawing all routes associated with the aforementioned provider edge network device. If the customer edge network device has a large number of such routes, then the route withdrawal process may take, on a relative basis, a long time. During the time it takes to withdraw all of the aforementioned routes, the customer edge network device will continue to send packets to the aforementioned provider edge network device, which will in turn drop these packets.

In addition to disabling interfaces and, ultimately, preventing packets from being transmitted to provider edge network devices that do not have any established BGP sessions, embodiments also enable previously disabled interfaces when the provider edge network device establishes at least one BGP session with a neighbor. In this embodiment, once the provider edge network device establishes at least one BGP session with a neighbor, the provider edge network device proceeds to initiate a recovery timer. The recovery timer includes a default (or user configurable) amount of time that the provider edge network device delays enabling the previously disabled interface(s). The duration of the recovery timer is intended to be a sufficient amount of time for the provider edge network device to receive routes (via the BGP session(s)) and to program these routes into its network device hardware (e.g., into the network device's data plane). In certain scenarios, if the provider edge network device enables the previously disabled interface(s) prior to the expiration of the recovery timer, the provider edge network device may have not received the routes from its neighbors and/or the received routes may not be programmed into the network device hardware. In either scenario, the result is that any packets received during this period will not be forwarded. Embodiments use the recovery timer to prevent these aforementioned scenarios from occurring.

The following describes various embodiments of the disclosure using FIGS. 1-4.

FIG. 1 shows a diagram of a system in accordance with one or more embodiments. The system includes customer networks (e.g., customer network A (100A), customer network B (100B)) operatively connected to each other via a provider network (102). More specifically, the customer networks (e.g., 100A, 100B) are able to send packets to and receive packets from the provider network using customer network devices (e.g., customer network device A (104A), customer network device B (104B)) and provider network devices (e.g., provider network device A (106A), provider network device B (106B)).

In one or more embodiments, the customer networks (e.g., 100A, 100B) include any combination of network devices (e.g., routers, switches, wireless access points, multilayer switches, etc.) and computing devices (e.g., servers, personal computers, laptops, Internet of Things (IoT) devices, etc.). The customer networks (e.g., 100A, 100B) may be implemented using any combination of wired and wireless communication protocols.

In one or more embodiments, the provider network (102) includes any number of provider network devices (e.g., 106A, 106B) arranged in any known or later developed topology. The provider network may include any combination of wired and/or wireless networks and may be implemented using any combination or wired and/or wireless communication protocols.

In one embodiment of the disclosure, the one or more network device(s) (which may be customer network devices (e.g., 104A, 104B), provider network devices (e.g., 106A, 106B) and/or network devices in the customer networks) are physical devices that include persistent storage, memory (e.g., random access memory), one or more processor(s) (including a switch chip), and two or more physical ports (also referred to as interfaces). In one embodiment of the disclosure, the switch chip is part of the network device hardware that determines which egress port on a network device to forward media access control (MAC) frames. The switch chip may include egress and ingress ports that may connect to physical ports on the network device. Each of the physical ports may or may not be connected to another device on a network device on a network (e.g., a server, a switch, a router, etc.). The network device may be configured to receive packets via the physical ports and determine whether to: (i) drop the packet; (ii) process the packets; and/or (iii) send the packet, based on the processing, out another port on the network device.

How the network device makes the determination about whether to drop the packet, and/or send the packet to another device on the network depends, in part, on whether the network device is a layer-2 (L2) switch or a layer-3 (L3) switch (also referred to as a multilayer switch), which may perform at least some functions of a router. If the network device is operating as a L2 switch, the network device uses the destination MAC address along with a forwarding table to determine out of which port to send the packet. If the network device is operating as a L3 switch, the network device uses the destination Internet Protocol (IP) address along with a routing table to determine out of which port to send the packet, and includes the ability to write the MAC address of the next device to receive the packet in place of its own MAC address (which the last device to send the packet wrote) in the L2 information encapsulating the packet. If the network device is a multilayer switch, the multilayer switch includes functionality to process packets using both MAC addresses and IP addresses.

In one or more embodiments of the disclosure, the network device may implement one or more communication protocols, e.g., Border Gateway Protocol to enable the network device to send and receive packets from other devices, e.g., other network devices, servers, IoT devices, laptops, etc.

In one embodiment of the disclosure, the persistent storage in the network device may include any type of non-transitory computer readable medium that includes instructions, which, when executed by one or more processor(s) in the network device, enable the network device to perform functions described in accordance with one or more embodiments of the disclosure.

Examples of network devices include, but are not limited to, a router, a switch, and a multilayer switch. The network device is not limited to the aforementioned specific examples.

While the system shown in FIG. 1 includes a limited number of customer networks, customer network devices, provider network devices, and a provider network, the disclosure is not limited to such a system; rather, embodiments of the disclosure may be implemented using any number of customer networks, customer network devices, provider network devices, and provider networks.

Figure 2:
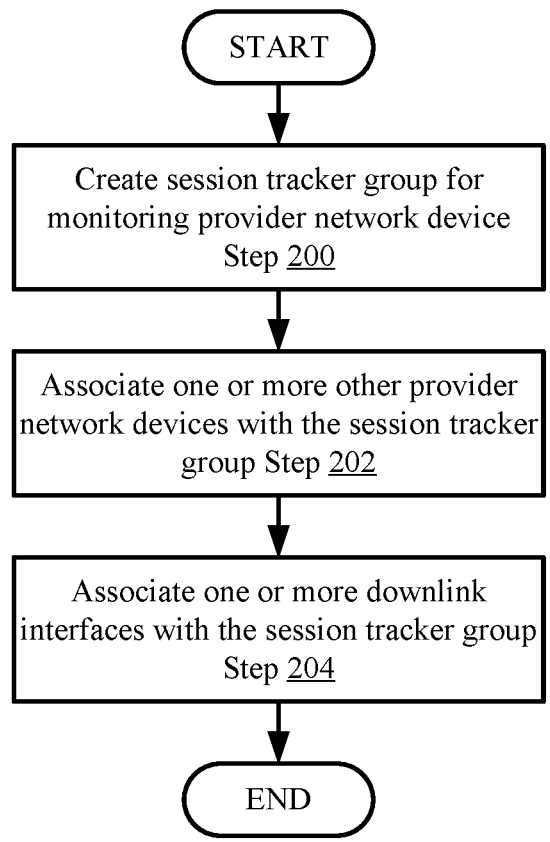
FIG. 2 shows a method for configuring a provider network device in accordance with one or more embodiments.

FIG. 2 shows a method for configuring a provider network device in accordance with one or more embodiments. The method of FIG. 2 may be performed by, for example, a provider network device (e.g., 106A, 106B). Other components illustrated in FIG. 1 may perform the method of FIG. 2 without departing from embodiments of the disclosure. Further, one or more steps in FIG. 2 may be performed concurrently with one or more steps in FIG. 3.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, a session tracker group is created. At this stage, the session tracker group may correspond to a data structure that includes an identifier (which uniquely identifies the session tracker group from all other session tracker groups on the network device (e.g., the provider network device). Additional data may be added to this data structure in steps 202 and 204.

In step 202, one or more provider network devices are associated with the session tracker group created in step 200. In one embodiment, the provider network devices are each associated with a known Internet Protocol (IP) address (e.g., an IPv4 or IPv6 address). In such scenarios, step 202 may include associating the session tracker group with one or more of the aforementioned IP addresses. In another embodiment, the session tracker group is associated with an IP address range. In this scenario, any other provider network device that establishes a BGP session with the provider network device (i.e., the provider network device on which the session tracking group was established in step 200) that has an IP address within the specified IP address range is associated with the session tracker group created in step 200. In another embodiment, one or more provider network devices may be associated with a group (which is identified using a group name) and then the group name is associated with the session tracker group. The membership of the group may be determined using IP addresses and/or IP address ranges.

In one embodiment, the session tracker group may be associated with one or more provider network devices using any combination of the embodiments discussed above.

In one or more embodiments, the provider network devices associated with the session tracker group are BGP neighbors (also referred to as BGP peers) of the provider network device.

While the description of step 202 specifies various embodiments for associating a session tracker group with one or more BGP peers, any other method for associating a BGP peer with a session tracker group may be used without departing from the disclosure.

In step 204, one or more downlink interfaces are associated with the session tracker group. In one embodiment, the downlink interfaces (or ports) are the physical interfaces of the provider network device (i.e., the provider network device for which the session tracker group was created in step 200) that are to be disabled when the provider network device does not have any BGP sessions with any of the other provider network devices specified in step 202. In one embodiment, one or more of the downlink interfaces on the provider network device are directly connected to an interface on a customer network device. Thus, when the downlink interface is disabled, the customer network device stops transmitting packets from the interface that is connected to the downlink interface. Said another way, in one embodiment, a downlink interface is directly connected, via a network cable, to an interface on the customer network device; when the downlink interface is disabled, the customer network device detects that the link between the interface and the downlink interface is down. In response to this determination, the customer network device stops sending packets from the interface (i.e., the interface that is connected to the now disabled downlink interface).

In one embodiment, the session tracker group is also associated with a recovery timer value. The recovery timer value may be set to a default value or to a user specified value.

The provider network device may include (or otherwise implement) a command line interface (CLI) that enables users of the provider network device to perform the steps in FIG. 2.

The method shown in FIG. 2 may be performed to generate one or more session tracker groups.

Figure 3:
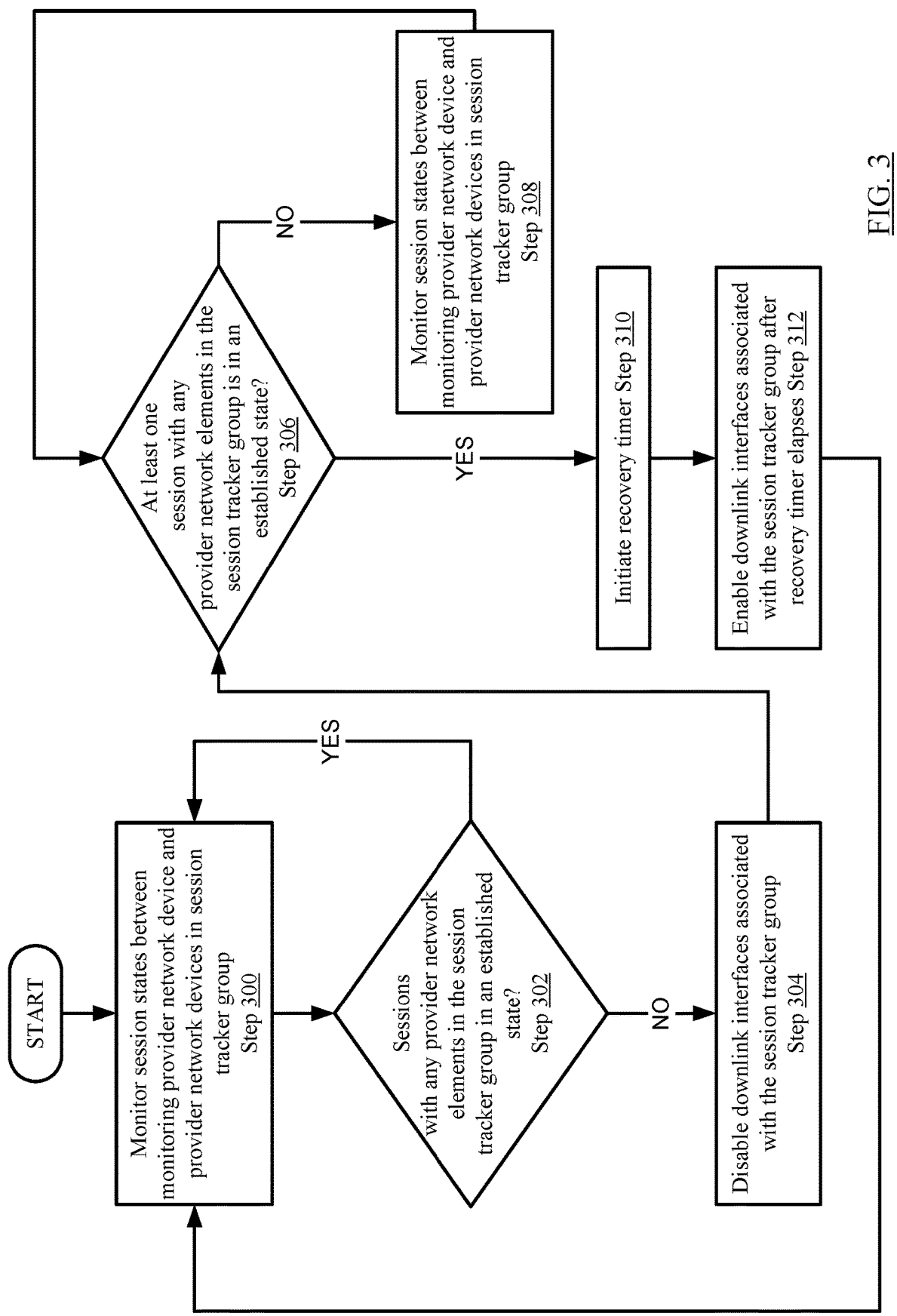
FIG. 3 shows a method for managing a provider network device in accordance with one or more embodiments.

FIG. 3 shows a method for managing a provider network device in accordance with one or more embodiments. The method of FIG. 3 may be performed by, for example, a provider network device (e.g., 106A, 106B). Other components illustrated in FIG. 1 may perform the method of FIG. 3 without departing from embodiments of the disclosure. Further, one or more steps in FIG. 3 may be performed concurrently with one or more steps in FIG. 2.

In step 300, the session states of the BGP sessions between the provider network device (i.e., the network device performing the method in FIG. 3) and the provider network devices specified in the session tracker group are monitored.

In step 302, a determination is made about whether there are any BGP sessions in an established state between the provider network device and the other provider network devices specified in the session tracking group. In one embodiment, a provider network device may establish a BGP session with another provider network device. The BGP session, per BGP, may be in one of the following states: idle, connect, active, opensent, openconfirm, and established. When the BGP session is in an established state, the provider network device and the other provider network device that is part of the BGP session are exchanging information about the routes that they are advertising. When the BGP session is not in an established state, then routing information is not being exchanged between the BGP peers. If there are no BGP sessions in an established state (i.e., the provider network device is not exchanging routing information) with any of the provided network devices in the session tracker group then the process proceeds to step 304; otherwise, the process returns to step 300 (i.e., the provider network device is exchanging routing information with at least one other provider network device specified in the session tracker group).

In step 304, because the provider network device is not exchanging routing information with any other provider network device specified in the session tracker group, the provider network device disables all of the downlink interfaces specified in (or otherwise associated with) the session tracker group (see e.g., FIG. 2, step 204). At this stage, the provider network device is not receiving any packets on the disabled interfaces.

At some later point in time, there may be a BGP session between the provider network device and at least one provider network device specified in the session tracker group that is in the established state. This may occur, for example, in scenarios in which connectivity between the provider network device and at least one other provider network device specified in the session tracker group is restored. Once connectivity is restored, a BGP session may be instantiated and ultimately transition to an established state. The provider network device may be configured to monitor BGP sessions to determine if they transition to an established state.

In step 306, a determination is made about whether any of the BGP sessions between the provider network device and at least one other provider network device specified in the session tracker group have transitioned to an established state. If at least one such BGP session has transitioned to the established state, then the process proceeds to step 310; otherwise, the process proceeds to step 308.

In step 308, the provider network device continues to monitor BGP sessions between the provider network device and at least one other provider network device specified in the session tracker group to determine whether any of these BGP sessions have transitioned to an established state. The process then proceeds to step 306.

Continuing with the discussion of FIG. 3, if at least one such BGP session has transitioned to the established state, then in step 310, the recovery timer is initiated. More specifically, in one embodiment, the recovery timer value specified in the associated session tracker group is obtained and the recovery time is initiated with the recovery timer value. Prior to expiration of the recovery timer, the routing information is exchanged via the BGP session and the network device hardware (e.g., the switch chip) of the provider network device is programmed using the received routing information.

In step 312, after the recovery timer elapses, the provider network device enables the previously disabled downlink interfaces associated with the session tracker group. The process then proceeds to step 300.

The method shown in FIG. 3 may be continuously performed by the provider network device on each of the configured session tracker groups.

Example

Figure 4:
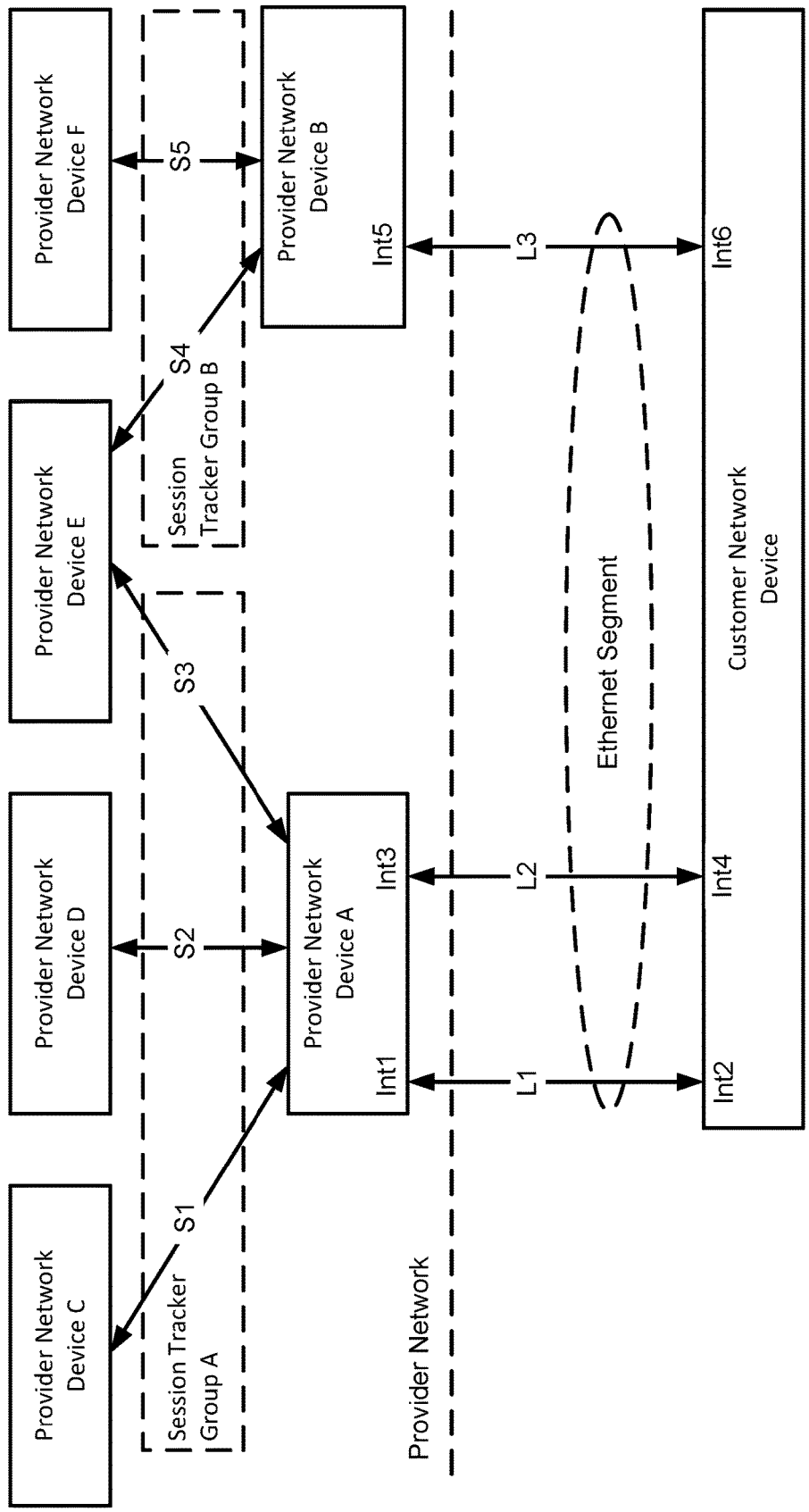
FIG. 4 shows an example in accordance with one or more embodiments.

FIG. 4 shows an example in accordance with one or more embodiments. The example is not intended to limit the scope of the disclosure.

Setup

Consider a system in which there is a provider network that includes provider network devices A-F. Provider Network Device A is a provider edge network device and is connected, via two links (L1, L2), to a customer network device. Further, Provider Network Device B is also a provider edge network device and is connected, via a link (L3), to the customer network device. Links, L1, L2, and L3, are associated with an Ethernet Segment and, therefore, form a link aggregation group (LAG). Said another way, from the perspective of the customer network device, L1, L2, and L3 form a LAG and, as such, packets destined for the provider network may be issued over L1, L2 or L3.

In this example, Session Tracker Group A is configured on Provider Network Device A. Session Tracker Group A specifies provider network devices C-E and downlink interfaces, Int1 and Int3. Further, Session Tracker Group B is configured on Provider Network Device B. Session Tracker Group B specifies provider network devices E-F and downlink interface, Int5.

Scenario 1

Consider a scenario in which Provider Network Device A initially has three established BGP sessions (S1-S3) with provider network devices C-E, respectively. At a later point in time, all three BGP sessions transition out of the established state. Provider Network Device A, which is monitoring the state of the aforementioned BGP sessions, determines that there are no established BGP sessions associated with Session Tracker Group A. In response to this determination, Provider Network Device A disables downlink interfaces Int1 and Int3. Once Int1 and Int3 are disabled, the customer network device no longer transmit packets from: (a) Int2, which is connected via L1, to Int1 or (b) Int3, which is connected via L2, to Int4.

Scenario 2

Following the events in Scenario 1, BGP session S4 also transitions out of the established state; however, because BGP session S5 is still in an established state, downlink Int5 is not disabled (i.e., packets may continue to be transmitted over L3).

Scenario 3

Following the events in Scenario 1, BGP session S3 transitions to an established state. Provider Network Device A, which is monitoring the state of the aforementioned BGP session, determines that there is at least one established BGP session associated with Session Tracker Group A. In response to this determination, Provider Network Device A obtains the recovery timer value associated with the Session Tracker Group A and starts the recovery timer. Once the recovery timer elapses, Provider Network Device A enables downlink interfaces Int1 and Int3. Customer network device detects that Int1 and Int3 are active and resumes transmitting packets to Provider Network Device A via L1 and L2.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing network devices in a network, comprising:
    creating a session tracker group, wherein the session tracker group:
        is associated with a first network device,
        specifies a second network device and a third network device, and
        specifies an interface associated with a fourth network device, wherein the interface is associated with a link that directly connects the first network device and the fourth network device;
    monitoring:
        the first network device to determine if there is a first session between the first network device and the second network device, and the first network device to determine if there is a second session between the first network device and the third network device;

making a determination, based on the monitoring, that there is no first session and no second session; and in response to the determination, disabling the interface, wherein the first network device does not receive any network traffic from the fourth network device after the disabling.

2. The method of claim 1, further comprising:

after the disabling, making a second determination that there is a third session between the first network device and the second network device;

based on the second determination, initiating a recovery timer; and enabling, once the recovery timer has elapsed, the interface.

3. The method of claim 2, wherein the third session is a Border Gateway Protocol (BGP) session.

4. The method of claim 1, wherein the second network device is a Border Gateway Protocol (BGP) neighbor of the first network device.

5. A method for managing network devices in a network, comprising:

making, by a network device, a determination that there are no established sessions between the network device and any of a plurality of network devices, wherein the network comprises the network device and the plurality of network devices; and in response to the determination, disabling, by the network device, an interface associated with a link between the network device and a second network device, wherein the second network device is external to the network.

6. The method of claim 5, wherein making the determination that there are no established sessions between the network device and any of the plurality of network devices comprises:

determining that there are no established Border Gateway Protocol (BGP) sessions between the network device and any of the plurality of network devices.

7. The method of claim 5, wherein making the determination that there are no established sessions between the network device and any of the plurality of network devices comprises:

determining that there are no established sessions associated with a session tracker group, wherein the network device is associated with the session tracker group, wherein the session tracker group specifies the network device, a third network device and the interface, wherein the third network device is one of the plurality of network devices.

8. The method of claim 7, wherein the network device is associated with a second session tracker group.

9. The method of claim 7, wherein the third network device is a Border Gateway Protocol (BGP) neighbor of the network device.

10. The method of claim 7, wherein session tracker group further specifies a second interface.

11. The method of claim 10, wherein the second interface is associated with a second link between the network device and the second network device, wherein the link and the second link are part of a link aggregation group configured on the second network device.

12. The method of claim 11, wherein the link aggregation group comprises a third link, wherein the third link does not connect the second network device to the network device, and wherein the third link connects the second network device to the network.

13. The method of claim 12, further comprising:

in response to the determination, disabling, by the network device, the second interface, wherein the second network device does not disable a third interface associated with the third link.

14. A method for managing network devices in a network, comprising:

making, by a network device, a determination that there is at least one established session between the network device and at least one of a plurality of network devices specified in a session tracker group, wherein the network comprises the network device and the plurality of network devices; and in response to the determination:

initiating a recovery timer; and enabling, once the recovery timer has elapsed, an interface associated with a link between the network device and a second network device, wherein the second network device is external to the network, wherein the interface is specified in the session tracker group.

15. The method of claim 14, wherein the at least one established session is a Border Gateway Protocol (BGP) session.

16. The method of claim 14, wherein the at least one of a plurality of network devices is a Border Gateway Protocol (BGP) neighbor of the network device.

17. The method of claim 14, wherein the network device is associated with a second session tracker group, wherein the second session tracker group specifies a second plurality of network devices and a second interface, and wherein the network comprises the second plurality of network devices.

18. The method of claim 17, further comprising:

making, by the network device, a second determination that there is at least one established session between the network device and at least one of the second plurality of network devices; and in response to the second determination:

initiating a second recovery timer; and enabling, once the second recovery timer has elapsed, the second interface.

19. The method of claim 17, wherein the plurality of network devices does not overlap with the second plurality of network device.

20. The method of claim 14, wherein the session tracker group further specifies a second interface associated with a second link between the network device and a third network device, wherein the third network device is external to the network, and wherein the method further comprises:

enabling, once the recovery timer has elapsed, the second interface.

* * * * *